Patented Oct. 7, 1941

2,258,410

UNITED STATES PATENT OFFICE 2,258,410

METHOD OF MAKING STABLE VINYL RESINS

Joseph Dahle, Springfield, Mass., assignor to Monsanto Chemical Company, St. Louis, Mo., a corporation of Delaware No Drawing. Continuation of application Serial No. 122,575, January 27, 1937. This application June 20, 1939, Serial No. 280,125

15 Claims. (Cl. 260—73)

My invention relates to vinyl acetal resins of the kind described in the patent to Morrison et al. No. 2,036,092, dated March 31, 1936, and French patent to Carbide & Carbon Chemicals Corporation, No. 792,661, published January 17, 1936. These resins are useful for many purposes, particularly in the manufacture of plastics and for sandwich layers for laminated glass. However, difficulty has been experienced owing to lack of stability which manifests itself by loss of solubility and by discoloration when subjected to heat. This lack of stability has been a serious defect in these resins and has greatly diminished their utility.

I have discovered a method for stabilizing these resins and have produced stable resins of this type which are very much more useful than resins heretofore produced. My present invention, therefore, includes my novel resin and the process of making it. The resin to be treated in accordance with the present invention may be formed either (1) by producing polyvinyl alcohol by the action of an acid or alkaline catalyst and then converting with an aldehyde to an acetal by the action of an acid catalyst, or (2) conducting the reactions in a single stage with an acid catalyst.

The first major step in the stabilization process is the neutralization of the acid catalyst remaining in the solution. In the preferred practice of the invention a suitable alkali or alkaline salt is added to the solution in which the resin has been produced to neutralize the particular acid catalyst which has been employed and the procedure will vary somewhat depending upon the solvent present in the resin solution.

If the solvent is an alcohol, or other lower aliphatic alcohol, such as methyl or ethyl alcohol, a water solution of an alkali or alkaline salt, such as sodium or potassium hydroxide or carbonate, containing an acohol concentration, preferably, equivalent to that of the resin solution is added to the resin solution. The quantity of alkali or alkaline salt added should be slightly in excess of that required to neutralize the mineral acid catalyst. The resin solution may be filtered either before or after treatment to remove dirt or other foreign substance. After the addition of the neutralizing agent the resin is then precipitated from the solution, preferably, by diluting the solution with a non-solvent, such as water, while the solution is stirred vigorously thereby precipitating the resin and disintegrating it in small particles. The surplus liquid is then drained from the precipitated resin. The precipitated resin is put in a kettle and a non-solvent for the resin, such as water, containing about 10 to 20% of alcohol, or other lower aliphatic alcohol, such as methyl or ethyl alcohol, is added. This completes the step of neutralizing the acid catalyst in solution.

If the solvent is acetic acid, a water solution of sodium or potassium acetate containing acetic acid, preferably, equivalent to the concentration of the acetic acid in the resin solution is then added to the resin solution. The quantity of sodium or potassium acetate added should be more than equivalent to the mineral acid present. The resin then is precipitated from the resin solution, preferably, by diluting the solution with water while the solution is stirred vigorously thereby precipitating the resin in small particles. The precipitated resin is then washed with water until it contains not more than and, preferably, less than 1% acetic acid. The precipitated and washed resin is then placed in a kettle in a water suspension containing 10 to 20% of ethyl alcohol.

From this point the treatment of the resin is the same regardless of the type of solvent which was present in the solution in which the resin was produced.

The second major step is neutralization while in suspension. Accordingly, to the finely divided resin in suspension in water containing 10 to 20% alcohol is added an alkali, such as sodium or potassium hydroxide or carbonate, in amount up to about 0.2% of the weight of the batch. The mixture is heated at a temperature of from 60 to 80° C., preferably, for about two to ten hours. The time required for the treatment may be shortened by the use of a higher temperature or by increasing the alcoholic strength of the mixture. If the quantity of alkali added is great enough some of the residual acetate groups of the resin will be converted to alcohol groups, which tends to stiffen the resin and is desirable in some cases, especially where the acetal resin has a tendency to be soft. The amount of alkali used will be varied accordingly. The surplus liquid then is drained from the precipitated resin and the resin washed with water to remove alkali or any free salts.

The third major step is the stabilization with methanol. After washing, the resin is given a final stabilization treatment by subjecting it to the action of methanol, with which may in some cases be used tri-ethanol-amine or other amine body of basic characteristic, in a water suspension which may contain an alkali, such as sodium or potassium hydroxide or carbonate. The resin should be finely divided so the stabilization mixture can penetrate the resin within a reasonable time. A slight rise in temperature also facilitates this peneration. Suitable proportions by weight are:

(a) Resin _____ 100
    Water _____ 400
    Methanol _____ 50

(b) Resin _____ 100
    Water _____ 400
    Methanol _____ 40
    Tri-ethanol-amine _____ 0.1

(c) Resin _____ 100
    Water _____ 400
    Methanol _____ 40
    Potassium hydroxide _____ 0.1

The resin is then centrifuged. The centrifuged product will ordinarily contain residual methyl alcohol from 2 to 10% and less than 0.01% of tri-ethanol-amine, if used, and less than 0.05% of alkali salts. The resin then is dried at a temperature of 50 to 80° C., but a temperature of 100° C. or even higher may be used. While methanol appears to give the most satisfactory results it will be understood that other lower aliphatic alcohols may be advantageously employed.

The best results are obtained by employing each of the three major steps, namely, neutralization in solution, neutralization in suspension, and treatment with methanol. I find that the methanol treatment combined with neutralization in solution produces a certain definite improvement in stability, while neutralization in suspension followed by methanol treatment gives a satisfactory product only when the particle size is small, about 60 mesh. Neutralization in solution followed by neutralization in suspension produces a certain improvement in stability also while neutralization in suspension alone generally has been found unsatisfactory unless the resin is secured with a very fine particle size, about 80 mesh or finer. In general, a fine particle size is desirable to facilitate stabilization.

While the exact nature of the reactions which take place when the resin is treated in accordance with my invention is somewhat uncertain, nevertheless, the great improvement in stability of the resin produced has been demonstrated by severe tests. For instance, I have found that if five grams of the resin in the form of fine particles is placed in a U shaped tube of ⅜" diameter and air is passed through the tube at the rate of four liters per hour while the resin is heated at a temperature of 150° C., there is no appreciable change in color or in solubility characteristics at the end of four hours. On the other hand, the best resins now available and which are believed to be made either by the process described in the Morrison Patent No. 2,036,092 or in French Patent No. 792,661 when given the same test darken to light brown in the case of formaldehyde resins, and dark brown in the case of butyraldehyde resins before the end of four hours.

It is possible that the residual catalyst in the unstabilized resin, or foreign substances included in the raw materials from which the resins are prepared produces unstable decomposition products. Stabilizing treatment undoubtedly removes minute residuums of the acid catalyst. It is also possible that alkyl sulfates or halides are formed in the resin solution and the resin itself and that these are causes of instability. The methanol may combine with such compounds to form products which are either stable or soluble, or are volatile. It is also possible that uncombined aldehydes may be a cause of instability and that they react with methanol in presence of traces of a mineral acid to produce compounds which are stable, soluble or volatile.

Treatment in accordance with the invention effects an improvement in the stability of the resin regardless of the method used in the manufacture of the resin. However, the best results are obtained by treating resins which have been carefully prepared in accordance with the best practice known in the art. Thus, it is well known in the art that in acetalization with the higher aliphatic aldehydes, the use of too high temperature, for example, 80° C., or heating for too long a time, for example, for more than eight hours, or the use of too large a quantity of catalyst in acetalization, such as more than 2 per cent of the weight of the total reaction mixture, tend to produce discolored resins. The use of an excess of aldehyde which will remain unreacted should be avoided or the excess removed. Care should be exercised to avoid all such known faulty manufacturing procedures in the preparation of resins prior to treatment in accordance with the invention if maximum stability is desired. The present application is a continuation of my prior application, Serial No. 122,575, filed January 27, 1937.

I claim:

1. The method of stabilizing a vinyl acetal resin formed in the presence of a mineral acid catalyst which includes the steps comprising subjecting a solution of the resin to the action of a neutralizing agent for the acid catalyst, subjecting a suspension of the resin to the action of a neutralizing agent for the acid catalyst, and subjecting a suspension of the resin to the action of methanol.

2. The method of stabilizing a vinyl acetal resin formed in the presence of a mineral acid catalyst which includes the steps comprising subjecting a solution of the resin to the action of a neutralizing agent for the acid catalyst, and subjecting a suspension of the resin to the action of a neutralizing agent for the acid catalyst.

3. The method of stabilizing a vinyl acetal resin formed in the presence of a mineral acid catalyst which includes the steps comprising subjecting a solution of the resin to the action of a neutralizing agent for the acid catalyst, and subjecting a suspension of the resin to the action of methanol.

4. The method of stabilizing a vinyl acetal resin formed in the presence of a mineral acid catalyst which includes the steps comprising subjecting a suspension of the resin to the action of a neutralizing agent for the acid catalyst, and subjecting a suspension of the resin to the action of methanol.

5. The method of stabilizing a vinyl acetal resin formed in the presence of a mineral acid catalyst which includes the steps comprising precipitating and disintegrating the resin by simultaneously stirring the solution and adding a non-solvent for the resin and subjecting a suspension of the resin to the action of a neutralizing agent for the acid catalyst.

6. The method of stabilizing a vinyl acetal resin formed in the presence of a mineral aicd catalyst which includes the steps comprising subjecting a suspension of the resin to the combined action of methanol and a neutralizing agent for the acid catalyst.

7. That step in the production of a stable polyvinyl acetal resin produced by the action of an acid catalyst which comprises subjecting the acid-free resin while in suspension to the action of methanol.

8. The method of stabilizing a vinyl acetal resin formed in the presence of a mineral acid catalyst which includes the steps comprising subjecting a solution of the resin to the action of a neutralizing agent for the acid catalyst, subjecting a suspension of the resin to the action of a neutralizing agent for the acid catalyst, and subjecting a suspension of the resin to the action of a lower aliphatic alcohol.

9. The method of stabilizing a vinyl acetal resin formed in the presence of a mineral acid catalyst which includes the steps comprising subjecting a solution of the resin to the action of a neutralizing agent for the acid catalyst, and subjecting a suspension of the resin to the action of a lower aliphatic alcohol.

10. The method of stabilizing a vinyl acetal resin formed in the presence of a mineral acid catalyst which includes the steps comprising subjecting a suspension of the resin to the action of a neutralizing agent for the acid catalyst, and subjecting a suspension of the resin to the action of a lower aliphatic alcohol.

11. The method of stabilizing a vinyl acetal resin formed in the presence of a mineral acid catalyst which includes the steps comprising subjecting a suspension of the resin to the combined action of a lower aliphatic alcohol and a neutralizing agent for the acid catalyst.

12. That step in the production of a stable polyvinyl acetal resin produced by the action of an acid catalyst which comprises subjecting the acid-free resin while in suspension to the action of a lower aliphatic alcohol.

13. The method of stabilizing a vinyl acetal resin formed in the presence of a mineral acid catalyst which includes the steps comprising subjecting a suspension of the resin to the combined action of ethanol and a neutralizing agent for the acid catalyst.

14. The method of stabilizing a vinyl acetal resin formed in the presence of a mineral acid catalyst which includes the step comprising subjecting a suspension of the resin to the combined action of a lower aliphatic alcohol and an inorganic alkaline neutralizing agent for the acid catalyst.

15. The method of stabilizing a vinyl acetal resin formed in the presence of a mineral acid catalyst which includes the step comprising subjecting a suspension of the resin to the combined action of ethanol and an inorganic alkaline neutralizing agent for the acid catalyst.

JOSEPH DAHLE.